United States Patent
Caro et al.

(10) Patent No.: US 8,327,631 B2
(45) Date of Patent: Dec. 11, 2012

(54) AIR POLLUTION CONTROL SYSTEM FOR OCEAN-GOING VESSELS

(76) Inventors: Sal Caro, Camarillo, CA (US); Henning Ottsen, Ventura, CA (US); John Powell, Santa Clarita, CA (US)

(*) Notice: Subject to any disclaimer, the term of this patent is extended or adjusted under 35 U.S.C. 154(b) by 1049 days.

(21) Appl. No.: 11/092,477

(22) Filed: Mar. 28, 2005

(65) Prior Publication Data

US 2006/0213197 A1    Sep. 28, 2006

(51) Int. Cl.
*F01N 3/00*    (2006.01)
(52) U.S. Cl. .......... 60/297; 60/274; 60/286; 60/301; 60/303; 60/311; 60/320
(58) Field of Classification Search .......... 60/274, 60/286, 297, 301, 303, 311, 320; 440/89 A, 440/89 R, 113
See application file for complete search history.

(56) References Cited

U.S. PATENT DOCUMENTS

| | | | |
|---|---|---|---|
| 5,035,188 A * | 7/1991 | Johnson et al. | 110/345 |
| 5,460,301 A | 10/1995 | Ebinger et al. | 222/626 |
| 5,823,218 A | 10/1998 | Schlecht et al. | 137/1 |
| 6,314,722 B1 * | 11/2001 | Matros et al. | 60/274 |
| 6,422,007 B1 * | 7/2002 | Hartick | 60/298 |
| 6,463,958 B1 | 10/2002 | Schwing | 137/615 |
| 6,647,711 B1 | 11/2003 | Spiegel et al. | 60/288 |
| 6,660,239 B2 | 12/2003 | Nagji | 423/245.3 |
| 6,667,011 B1 | 12/2003 | Munje et al. | 422/173 |
| 6,863,874 B1 * | 3/2005 | Twigg | 423/210 |
| 6,941,746 B2 * | 9/2005 | Tarabulski et al. | 60/286 |
| 7,117,669 B2 * | 10/2006 | Kaboord et al. | 60/288 |

OTHER PUBLICATIONS

U.S. Appl. No. 10/835,197, filed Apr. 29, 2004, Caro, et al.
U.S. Appl. No. 10/941,731, filed Sep. 14, 2004, Caro, et al.

* cited by examiner

*Primary Examiner* — Thomas Denion
*Assistant Examiner* — Diem Tran
(74) *Attorney, Agent, or Firm* — Kenneth L. Green

(57) ABSTRACT

A platform mounted emissions control unit includes a first system to reduce Particulate Matter (PM), Sulfur Dioxide ($SO_2$), and Volatile Organic Compounds (VOCs), and a second system to reduce Oxides of Nitrogen ($NO_x$). The systems serially process exhaust from a mobile or stationary pollution source. In one embodiment, first system is an Ionizing Wet Scrubber (IWS) and the second system is a Selective Catalytic Reducer (SCR), wherein the IWS processes the exhaust first to improve efficiency and service life of the SCR. A generator produces power required by the IWS and SCR, and heat from exhaust of the generator may be used convert urea to ammonia for use by the SCR, and to heat the exhaust flow into the SCR. The SCR may further include a heat exchanger to capture heat in the flow out of the SCR and use the captured heat to heat the flow into the SCR.

23 Claims, 6 Drawing Sheets

AIR POLLUTION CONTROL SYSTEM FOR OCEAN-GOING VESSELS

BACKGROUND OF THE INVENTION

The present invention relates to pollution reduction and in particular to a system for capturing and reducing airborne emissions from ocean going vessels while these vessels are in port or in the vicinity of a port, and from land based emissions sources such as trucks or locomotives.

A variety of human activities produce exhaust having harmful levels of emissions (i.e., pollution.) Large stationary emissions sources generally have dedicated co-located emissions control systems. However, some large emissions sources are mobile and require mobile emissions control systems which may be co-located with the mobile emissions sources while the mobile emissions sources are in motion, or while the mobile emissions sources are temporarily stationary. An example of such large mobile emissions source is an Ocean Going Vessel (OGV) which is stationary during calls on port. A substantial quantity of pollutants are produced by OGVs burning diesel fuel or bunker fuel. The exhaust produced by an engine burning these fuels is a complex mixture of thousands of gases and fine particulates. The particulates, which make up the commonly observed discharges known as soot or smoke, contain more than forty toxic air contaminants. These contaminants include arsenic, benzene, and formaldehyde along with other ozone-forming pollutants that are components of smog and acid rain, such as carbon dioxide ($CO_2$), sulfur dioxide ($SO_2$), and nitrogen oxides ($NO_x$). A single OGV may produce as much $NO_x$ as 12,500 automobiles or as an oil refinery, and thus may present substantial health risks to port workers and residents of surrounding communities. The pollutants may also cosmetically and/or physically damage local structures and equipment.

U.S. patent application Ser. No. 10/835,197, filed Apr. 29, 2004 for "Maritime Emissions Control System," and assigned to the assignee of the present invention, describes a maritime emissions control system which may be transported by barge or vessel to an OGV near or within a harbor. The maritime emissions control system captures and processes a main exhaust flow from the OGV to reduce emissions. The main exhaust flow may be from the OGV's engine(s), auxiliary engines, generators, and/or any other source of exhaust from the OGV.

The emissions control system of the '197 patent application includes a bonnet which is lowered over the OGV's stack, and a duct for carrying the main exhaust flow from the OGV's stack to emissions processing equipment carried by a barge alongside the OGV. A tower with an articulating arm deploys the bonnet over the stack. As a result of the distance the main exhaust flow must travel before reaching the emissions processing equipment, the temperature of the main exhaust flow is much lower than it's temperature upon being exhausted from an engine or engines.

The emissions control unit of the '197 application comprises a first system for reduction of nitrogen oxides ($NO_x$) and a second system for reduction of Particulate Matter (PM). The first system comprises four stages. The first stage comprises a Pre-Conditioning Chamber (PCC) quench vessel. The second stage comprises an oxidation column. The third stage comprises a reduction column. The fourth stage comprises a caustic (or polishing) column. The second system comprises a wet electrostatic precipitation system. The '197 application is herein incorporated by reference.

Although a preferred method for reducing $NO_x$ emissions is a Selective Catalytic Reducer (SCR) system, the system of the '197 application does not include an SCR system. The main exhaust flow would require heating to a high temperature before introduction into the SCR system. Also, ammonia used by SCR systems is typically generated by heating urea. The cost and space required for an energy source for such heating made known SCR systems impractical for the maritime emissions control system.

U.S. patent application Ser. No. 10/941,731, filed Sep. 14, 2004 for "High Thermal Efficiency Selective Catalytic Reduction (SCR) System," and assigned to the assignee of the present invention, describes an emissions control unit which transfers heat generated in one or more parts of the unit which generate heat to other parts of the system which require heat. For example, heat stored in exhaust from a diesel generator is used to convert urea to ammonia used by an SCR system, and/or the diesel generator exhaust may be used to heat the main exhaust flow before entry into the SCR. Additionally, a heat exchanger is used to transfer heat from a hot clean flow out of the SCR to the main exhaust flow entering the SCR. The '731 application is herein incorporated by reference.

Although the '731 patent application provides significant energy savings, the emissions control unit described in the '731 application may suffer reduced efficiency if the OGV uses a fuel resulting in high-sulfur diesel exhaust. The high-sulfur diesel exhaust requires higher temperatures at entry to the SCR, and therefore higher energy costs. Further, the sulfur and ammonia combine to form ammonium bisulfate, $NH_4HSO_4$. Ammonium bisulfate is a sticky, gummy substance which may clog and foul the SCR, severely reducing the SCR service life. Also, sulfur and water can combine to form sulfuric acid, $H_2SO_4$, which may cause serious corrosion problems to the SCR. Additionally, the emissions control unit described in the '731 application employs a SCR upstream of an Ionizing Wet Scrubber (IWS). This ordering of the system components was logical and obvious because the IWS requires significant cooling of the initially hot gas stream, whereas the SCR requires a hot gas stream which would otherwise have to be reheated after cooling for passage through the IWS. However, such an arrangement subjects the SCR to a gas stream laden with particulates and sulfur compounds, components that are later removed by the IWS, which particulates and sulfur compounds can clog and otherwise impair the performance and operational longevity of the SCR.

BRIEF SUMMARY OF THE INVENTION

The present invention addresses the above and other needs by providing a mobile platform mounted emissions control unit (ECU) which includes a first system to reduce Particulate Matter (PM), Sulfur Dioxide ($SO_2$), and Volatile Organic Compounds (VOCs), and a second system to reduce Oxides of Nitrogen ($NO_x$). The first system and the second system serially process exhaust from a mobile pollution source when in motion or stationary. In one embodiment, the first system is an Ionizing Wet Scrubber (IWS) and the second system is a Selective Catalytic Reducer (SCR), wherein the IWS processes the exhaust prior to entering the SCR to improve the efficiency and service life of the SCR. An diesel generator produces power required by the IWS and SCR, and heat from exhaust of the diesel generator may be used convert urea to ammonia for use by the SCR, and to heat the exhaust flow into the SCR. The SCR may further include a heat exchanger to capture heat in the flow out of the SCR and use the captured heat to heat the flow into the SCR. An ECU according to the present invention is particularly applicable to Ocean Going Vessels (OGVs), as well as to temporarily stationary or nearly stationary sources of air pollution such as trucks or locomotives at maintenance or waiting areas.

In accordance with one aspect of the invention, there is provided a maritime emissions control system comprising a barge, a generator, and an Emissions Control Unit (ECU) comprising an IWS system and an SCR system. The IWS system is mounted on the barge and is adapted to process an exhaust flow from an Ocean Going Vessel (OGV) to generate a first processed flow. The SCR system likewise is mounted on the barge and is adapted to receive the first processed flow and generate a second processed flow. The entire ECU system is powered by the barge mounted generator. The maritime emissions control system may further include a bonnet and an Emissions Capture System (ECS) mounted to the barge. The ECS includes a tower, an articulating arm extending from the tower, and a duct running the length of the tower and the articulating arm and connecting the bonnet to the ECU. The ECS is adapted to position the bonnet over a stack of an OGV.

Otherwise wasted heat from the generator exhaust may be mixed with urea to produce ammonia for the SCR, and a heat exchanger may be adapted to carry heat from the outflow of the SCR to the inflow of the SCR.

In accordance with another aspect of the invention, there is provided a method for cleaning OGV exhaust. The method includes delivering the exhaust to an ECU and processing the exhaust in the ECU. Delivering the exhaust to the ECU includes capturing the exhaust of the OGV and carrying the exhaust to the ECU. Processing the exhaust in the ECU comprises first processing the exhaust in an IWS to generate first processed exhaust, carrying the first processed exhaust to an SCR, processing the first processed exhaust in an SCR to generate second processed exhaust, and releasing the second processed exhaust to the atmosphere.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Figure 1:
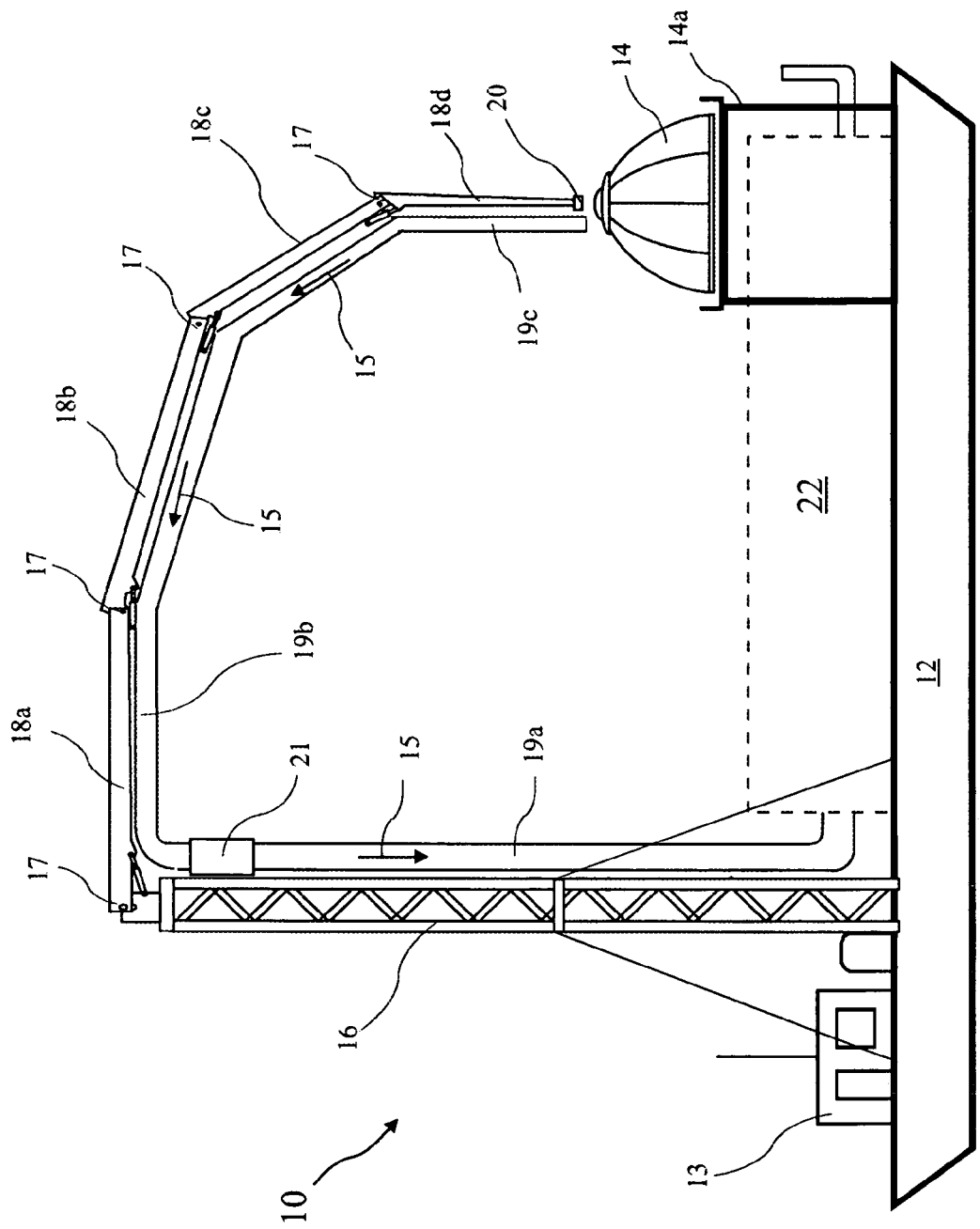
FIG. 1 is an Advanced Maritime Emissions Control System (AMECS).

An Advanced Maritime Emissions Control System (AMECS) 10 suitable for incorporation of the present invention is shown generally in FIG. 1. The AMECS 10 comprises at least one Exhaust Intake Bonnet (EIB) 14, an Emissions Capture System (ECS), and an Emissions Control Unit (ECU) 22. The AMECS 10 is preferably mounted on an Unpowered Seagoing Barge (USB) 12. The ECS comprises a tower 16, an articulating arm comprising four segments 18a, 18b, 18c, and 18d, a duct tower portion 19a running along the tower 16, and duct articulating arm portion 19b running along the actuating arm. The four segments 18a, 18b, 18c, and 18d are connected by joints 17.

The EIB 14 is preferably one of a multiplicity of shaped EIBs, and more preferably one of a set of four to six shaped EIBs, each shaped EIB is formed to cooperate with a different size and/or shape stack. The articulating arm end segment 18d is detachably attachable to the EIB 14 using a payload grip 20. A first camera is attached to the articulating arm, preferably on or near the payload grip 20, to aid in guiding the payload grip 20 during attachment to the EIB 14.

The EIB 14 is in fluid communication with the ECU 22 through the duct 19a, 19b. An end section of the duct 19b proximal to the EIB 14 is a flexible duct section 19c to allow for motion between the USB 12 and the OGV when the EIB 14 is attached to the OGV stack. In case of excessive wind loadings, the tip of the articulating arm may remain attached to the EIB to provide additional support; in this case, the controls of the articulating arm will incorporate a station keeping system to maintain the position of the EIB above the stack. The duct 19a-19c carries an exhaust flow 15 (indicated by arrows) to the ECU 22, which ECU 22 processes the exhaust flow 15 from the OGV, to reduce undesirable emissions. When in use, the exhaust flow 15 travels from the EIB 14 to the ECU 22. When not in use, the EIB 14 may be detached from the articulating arm, and rest on an EIB stand 14a. The EIBs 14 are preferably between fifteen feet and forty feet across, and are suitable for cooperation with stacks of various shape and up to twenty five feet or more across.

The articulating arm is preferably between fifty feet and one hundred and twenty feet long, and is more preferably between approximately one hundred feet and approximately one hundred and twenty feet long, and most preferably approximately one hundred feet long. The duct 19b is preferably between twelve inches and thirty six inches in diameter, and more preferably between eighteen inches and twenty four inches in diameter, and most preferably approximately twenty two inches in diameter. The duct 19b is preferably made from a heat resistant fabric reinforced with a external stainless steel helix. The fabric is preferably a high temperature impervious compound fabric.

The tower 16 is preferably between fifty feet and approximately one hundred and twenty feet high, more preferably between eighty feet and one hundred and approximately twenty feet high, and most preferably approximately one hundred and twenty feet high measured from the deck of the barge 12. Stays may be employed between the tower 16 and the barge 12 for additional support. The duct 19a is preferably rigid, preferably made from stainless steel, carbon steel, or aluminum, and is preferably coated to protect the duct 19a from the internal and external environment. The duct 19a is preferably between twenty four inches and thirty six inches in diameter, and more preferably approximately thirty inches in diameter. An inline duct fan 21 may be integrated into the duct 19a, preferably near the top of the tower 16. The fan 21 allows suitable pressure to be maintained within the EIB 14 to draw the OGV's exhaust into the ECU 22 without creating excessive back pressure on the OGV's engines or ingesting excessive amounts of atmospheric air from an imperfect seal of the EIB 14 around the OGV's exhaust stack, as well as avoiding excessive stress on the EIB 14 due to overpressure or underpressure within the EIB 14. Additionally, dampers and/or bypass valves may be integrated into the EIB 14 and/or the ducts 19a, 19b to help control the flow 15 through the ducts 19a, 19b. Adjustments to the fan 21 and/or to dampers and/or bypass valves and/or the EIB shroud allow the AMECS 10 to accommodate a variety of OGVs with different exhaust flows, as well as respond to changes in the exhaust flow on a given OGV due to starting or stopping an engine, or altering the load on engines.

The pressure within the EIB 14 is preferably controlled by varying the inline fan 21 operating parameters and/or by adjusting dampers and/or bypass valves and/or the EIB 14 shroud, such adjustments preferably being made automatically by an AMECS control system in response to inputs from pressure and flow sensors located in the EIB 14 and elsewhere. These adjustments may be made in concert with control system logic commands to the primary Induced Draft (ID) fan 34a (See FIGS. 4 and 5) and/or ID fan dampers located elsewhere in the AMECS, preferably at or near the downstream point of the cleaned OGV exhaust gas exit to atmosphere.

An actuating arm suitable for use with the present invention is similar to known four section booms used on concrete pump trucks, for example the KVM 32 built by Schwing America Inc. in Saint Paul, Minn. The boom of the KVM 32 is capable of reaching as far as 106 feet vertically, or 93 feet laterally. Booms like the boom of the KVM 32 are described in U.S. Pat. No. 5,460,301 for "Concrete Pump Vehicle" and duct joint geometries for use with booms are described in detail in U.S. Pat. No. 6,463, 958 for "Distributing Device for Thick Substance, Especially Concrete." The '301 and '958 patent are herein incorporated by reference. An AMECS 10 is described in U.S. patent application Ser. No. 10/835,197, filed Apr. 29, 2004 for "Maritime Emissions Control System," incorporated by reference above.

Figure 2:
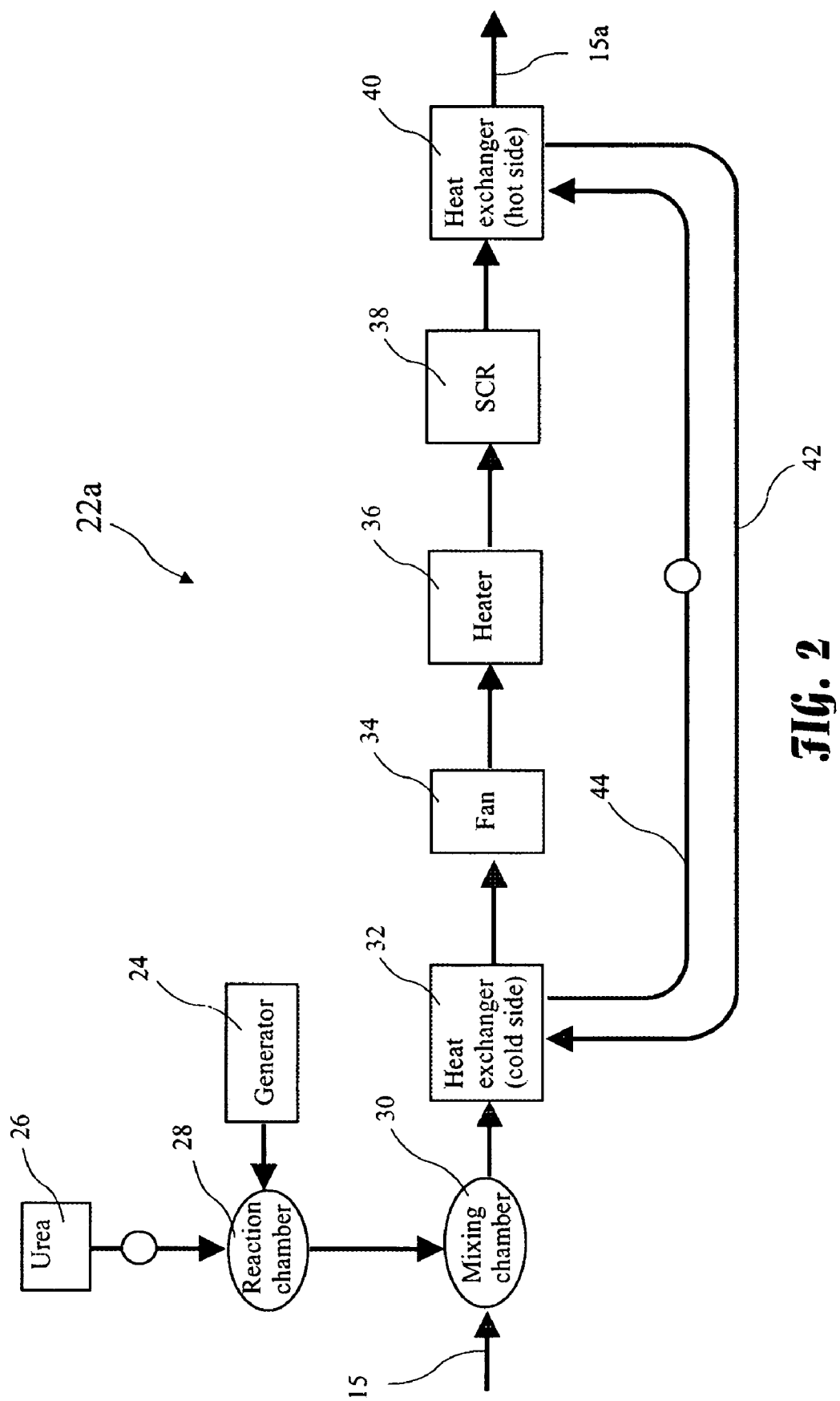
FIG. 2 is a prior art emissions control unit.

A prior art Emissions Control Unit (ECU) 22a configured for energy efficiency is shown in FIG. 2. The exhaust flow 15 flows into a mixing chamber 30. An diesel generator 24 provides generator exhaust as a heat source for a reaction chamber 28. The generator exhaust mixes with urea 26 to provide heat to convert the urea 26 to ammonia in the reaction chamber 28, and the generator exhaust remains mixed with the ammonia to add heat for subsequent processing. The ammonia mixed with the generator exhaust passes into the mixing chamber 30 where the ammonia and generator exhaust mixes with the OGV or other primary exhaust flow 15.

The flow from the mixing chamber 30 passes through a heat exchanger cold side 32 and is urged forward by the a fan 34 through a heater 36 and into a Selective Catalytic Reducer (SCR) 38. The heater 36 is preferably a burner or an electric heater, and more preferably a burner type heater, using the same fuel as the diesel generator. A chemical reaction in the SCR 38 between the ammonia and $NO_x$ in the exhaust flow converts the $NO_x$ to nitrogen gas and water producing a cleaned exhaust flow 15a. The flow 15a (now a hot flow) from the SCR 38 passes through a heat exchanger hot side 40. A heat transfer fluid is heated in the heat exchanger hot side 40 and flows through a rearward heat transfer tube 42 to the heat exchanger cold side 32 where heat is transferred to the flow through the heat exchanger cold side 32. The heat transfer fluid then flows back to the heat exchanger hot side 40 through a forward heat transfer tube 44. An emissions control unit 22a is described in U.S. patent application Ser. No. 10/941,731, filed Sep. 14, 2004 for "High Thermal Efficiency Selective Catalytic Reduction (SCR) System," incorporated by reference above.

Although the ECU 22a described in the '731 application provides the advantage of reducing energy requirements for the AMECS 10, in some cases, the ECU described in the '731 application may suffer reduced efficiency if the OGV uses a fuel resulting in a high sulfur content in the exhaust flow 15. The high sulfur exhaust requires higher temperatures at entry to the SCR 38, and therefore higher energy costs. The sulfur and ammonia combine to form ammonium bisulfate, $NH_4HSO_4$. Ammonium bisulfate is a sticky, gummy substance which may clog and foul the SCR 38, severely reducing its service life, and particulate matter (PM) can collect in the SCR 38 and reduce its effectiveness. Also, sulfur and water can combine to form sulfuric acid, $H_2SO_4$, which can cause serious corrosion problems to the SCR 38 and Particulate Matter (PM) can collect in the SCR and reduce its effectiveness.

Additionally, the ECU described in the '731 application places the SCR upstream of the IWS. This relative placement of the system components was chosen because the IWS requires significant cooling of the initially hot gas stream, whereas the SCR requires a hot gas stream which would otherwise have to be reheated after cooling for passage through the IWS. However, such an arrangement as in the '731 application subjects the SCR to a gas stream laden with particulates and sulfur compounds, components which are later removed by the IWS, and which can clog and otherwise impair the performance and operational longevity of the SCR.

Figure 3:
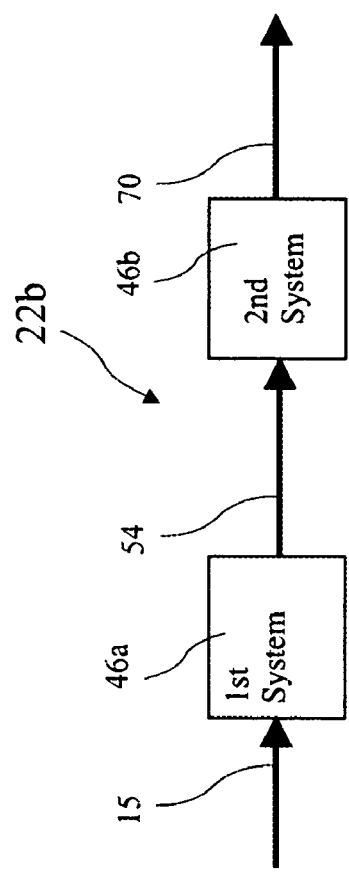
FIG. 3 shows an emissions control unit according to the present invention.

An improved Emissions Control Unit (ECU) 22b according to the present invention is shown in FIG. 3. The ECU 22b comprises a first system 46a and a second system 46b serially processing the exhaust flow (or dirty flow) 15. The system 46a is adapted to reduce Particulate Matter (PM) and Sulfur Dioxide ($SO_2$) and the system 46b is adapted to reduce $NO_x$. The system 46a may further reduce, in addition to reducing PM and $SO_2$, Volatile Organic Compounds (VOCs). The systems 46a and 46b are ordered with the system 46a processing the exhaust flow 15 to generate a first processed flow 54 and the system 46b processing the first processed flow to generate a second processed flow 70.

A Ionizing Wet Scrubber (IWS) suitable for use with the present invention is available from Ceilcote Corporation located in Strongsville, Ohio. The IWS combines features of an electrostatic precipitator, which device is relatively generic and made by several companies, with a wet scrubber which is also generic and made by numerous companies. A somewhat similar device is the Cloud Chamber Scrubber manufactured and patented by Tri-Mer Corporation in Owosso, Mich.

Selective Catalytic Reducer systems are well known and available from numerous companies including the following: Argillon LLC, Alpharetta, Ga., Babcock Power Environmental, Worchester, Mass., CRI, Inc., Houston, Tex., Englehard Corp, Iselin, N.J., Haldor-Topsoe, Houston, Tex., Mitsubishi Power Systems, Newport Beach, Calif., and Johnson Matthey, San Diego, Calif.

An ECU comprising the systems 46a and 46b is preferably self contained (e.g., unitized or modular) and may be mounted to a mobile platform, for example the barge 22 (see FIG.1), and may be palletized to allow moving the ECU between locations. Operating power for the systems 46a and 46b is preferably provided by a generator 24 (see FIG. 5) also mounted on the mobile platform. Further, a preferred system 46b for reducing $NO_x$ is a selective catalytic reduction system consuming ammonia and requiring a hot in-flow. Ammonia is commonly derived from nonhazardous liquid urea, which is a method preferred for the present invention. The conversion of urea to ammonia requires heat, and such heat may be provided by the hot exhaust gas of the diesel generator 24, saving energy otherwise required to heat the urea. The hot exhaust gas, now containing ammonia, may also be used to add heat to the OG V exhaust flow into the SCR.

The system 46a is preferably an Ionizing Wet Scrubber (IWS), a cloud chamber scrubber, a wet electrostatic precipitator, an electrostatic precipitator, a scrubber, an absorption device, a mechanical separator, a filter, a thermal device, or a plasma reactor, and is more preferably an IWS or a cloud chamber scrubber, and most preferably an IWS. The IWS may further be described as a combination of an electrostatic ionizer to reduce PM, and a wet scrubber to reduce $SO_2$.

The second system 46b is preferably a mid temperature Selective Catalytic Reducer (SCR), a low temperature SCR, a plasma based $NO_x$ reduction system, an ionization based $NO_x$ reduction system, a thermal $NO_x$ reduction system, a photochemical based $NO_x$ reduction system, a chemical $NO_x$ reduction system, or an electrochemical based $NO_x$ reduction system, and more preferably a mid temperature SCR or a low temperature SCR, and is most preferably a mid temperature SCR. The SCR preferably includes a core comprising a honeycomb structure or a granular or pelletized media composed of materials to support the reactions required to reduce $NO_x$, and more preferably includes a core comprising a honeycomb structure containing catalyst material comprising a titanium vanadium tungsten compound.

Figure 4:
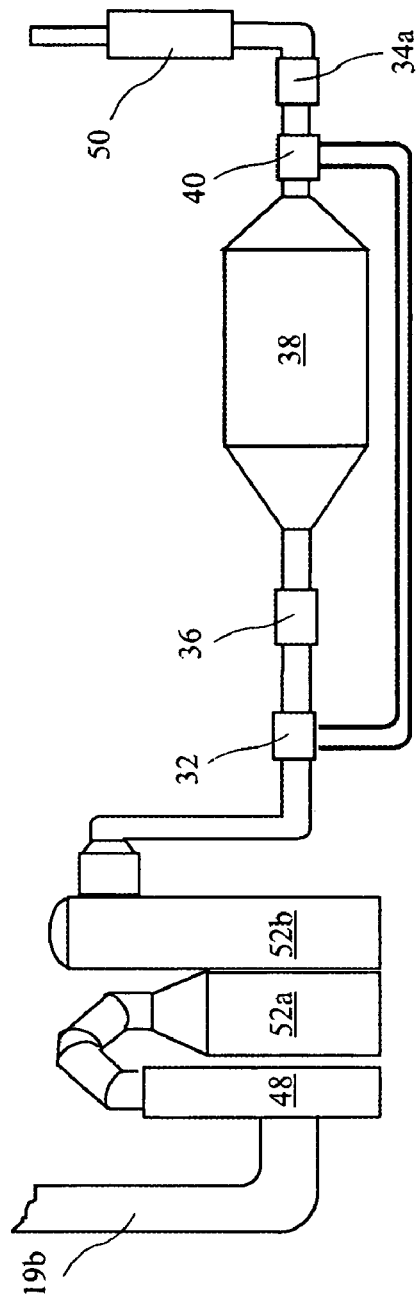
FIG. 4 shows details of one embodiment of the emissions control unit according to the present invention.

A physical layout of the ECU 22b according to the present invention is shown in FIG. 4. The duct 19b is connected to an inlet of a quench tower 48. An outlet of the quench tower 48 is connected to the ionizing section of an Ionizing Wet Scrubber (IWS) system comprising an ionizer 52a followed by a wet scrubber 52b. An outlet of the wet scrubber 52b is connected to the inlet section of a Selective Catalytic Reducer (SCR) 38 through a heat exchanger cold side 32 and a heater 36. An outlet of the SCR 38 is connected to a silencer 50 through a heat exchanger hot side 40 and an Induced Draft (ID) fan 34a.

Figure 5:
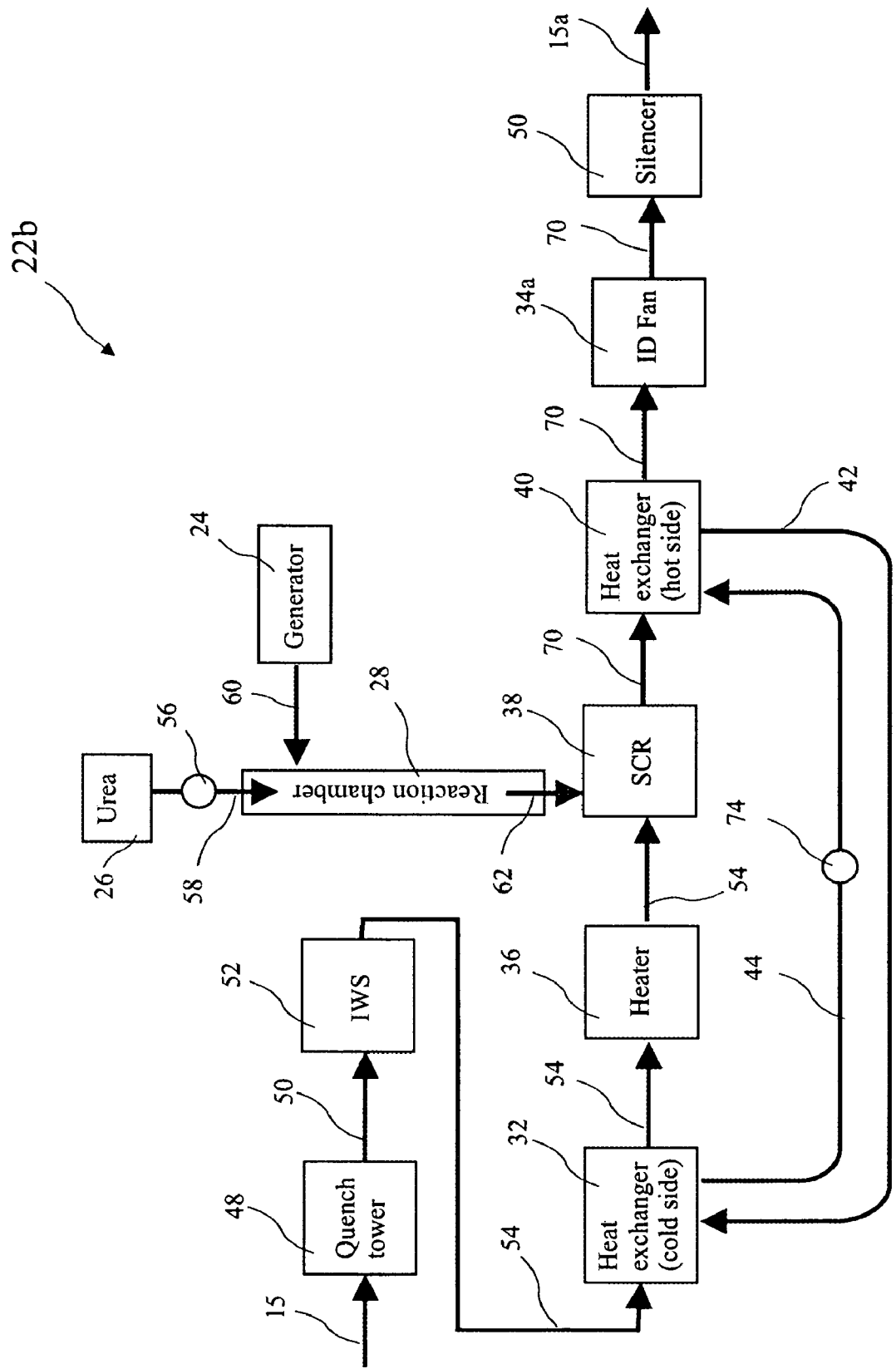
FIG. 5 shows a processing diagram of one embodiment of the emissions control unit according to the present invention.

A process diagram for the ECU 22b according to the present invention is shown in FIG. 5. The exhaust flow 15 is provided to the quench tower 48 where the temperature of the flow 15 is lowered to a temperature suitable for processing by the IWS 52. The temperature of the exhaust flow 15 is typically between 300 degrees Fahrenheit and 700 degrees Fahrenheit at entry into the quench tower 48. A cooled exhaust flow 50 is carried between the quench tower 48 and the IWS 52. The cooled exhaust flow preferably has a temperature between 100 degrees Fahrenheit and 120 degrees Fahrenheit, and more preferably has a temperature between 105 degrees Fahrenheit and approximately 115 degrees Fahrenheit, and most preferably has a temperature of approximately 115 degrees Fahrenheit. A first processed flow 54 is carried from the IWS 52 to the SCR 38 through the heat exchanger cold side 32 and the heater 36 where the temperature of the first processed flow is raised to a temperature sufficient for operation of the SCR 38. The raised temperature may be as low as approximately 450 degrees Fahrenheit for a low temperature catalyst, but is preferably between 600 degrees Fahrenheit and 700 degrees Fahrenheit, and is more preferably approximately 650 degrees Fahrenheit.

A generator exhaust flow 60 from a generator 24 is mixed in a reaction chamber 28 with aqueous urea flow 58 urged by a pump 56 from urea 26. The liquid urea is atomized by mixing with compressed air prior to injecting it into the reaction chamber 28 by means of a nozzle or nozzles. The reaction chamber 28 is preferably an exhaust manifold extension duct of the generator 24 and the extension duct is sized to ensure adequate residence time of the gas/urea mixture within the reaction chamber 28 so that the conversion of urea to ammonia is complete prior to injection into the SCR 38. The reaction chamber 28 is therefore sized to the application and, for example, a reaction chamber 28 sized to an OGV may be approximately 60 feet long and approximately 2 feet in diameter. The reaction chamber 28 preferably is connected directly to the SCR 38. To maximize the heat transfer to the urea flow 58, the exhaust manifold may be insulated to reduce heat loss.

As the urea flows through the reaction chamber 28, the urea flow 58 is converted into an ammonia flow 62, by the heat provided by the generator exhaust 60. The ammonia flow 62 enters SCR 38 where it mixes with the first processed flow 54. The ammonia flow 62 may be injected into the first processed flow 54 by either an ammonia injection grid or by other means that facilitates uniform mixing of the ammonia flow 62 and the first processed flow 54. The injection grid may be a manifold piping system for distributing the ammonia mixture evenly inside the SCR housing and injecting the ammonia into the first processed flow 54 as it enters and passes through the front section of the SCR 38. This front section of the SCR 38 is thus a mixing chamber. The generator exhaust 60, which now carries the ammonia, may be injected into the mixing area of the SCR through an injection grid which geometrically disperses the ammonia-carrying gas uniformly across the face of the catalyst. In some cases, the heat contained in the generator exhaust 60 may not be sufficient to completely convert the required amount of urea to ammonia. In these cases, the generator exhaust 60 may be further heated by a burner, or by an electric heater powered by the generator 24.

More specifically, the aqueous urea (typically a 40% solution) is heated, by the exhaust from the power generator 24, to produce evaporated ammonia. An "ammonia skid" meters the aqueous urea into the generator's exhaust according to the level of $NO_x$ in the main (e.g., the OGVs) exhaust stream. The heat in the generator exhaust stream causes a chemical reaction to occur wherein the urea is converted into ammonia, the reaction occurring over a finite time interval, such time interval provided for by making the generator exhaust pipe long enough that by the time the gas has traveled the length of the pipe, the reaction has gone to completion, resulting in the transformation of the urea into ammonia vapor. The liquid urea may atomized, or vaporized, by forcing it through a nozzle with high pressure air, into the reaction chamber 28 proximal to an end opposite the SCR 38. The vaporized ammonia enters the main OGV exhaust stream at the Ammonia Insertion Grid within the SCR 38 housing. The following mixing chamber is to ensure that the temperature of the flow and the concentration of ammonia is evenly distributed across the face of the catalyst prior to its passing through the catalyst. The mixing chamber is preferably the inlet section of the SCR 38.

An alternative to urea as a source for ammonia is aqueous ammonia (also known as ammonium hydroxide.) The aqueous ammonia is preferably an approximately 19% to 40% concentration of ammonia in water, and more preferably an approximately 19% concentration of ammonia in water. The aqueous ammonia may be injected into the generator exhaust 60 stream in a manner similar to the urea injection described above. The main differences are that the exhaust temperature need not be as high for the aqueous ammonia and a residence time in a reaction chamber is not required for the aqueous ammonia. The exhaust temperature need only be approximately 600 degrees Fahrenheit for the aqueous ammonia as opposed to the approximately 1000 degrees Fahrenheit needed for urea, and because the residence time in the reaction chamber is not required, a reaction chamber is not needed. Thus, although urea is the more benign substance, aqueous ammonia requires less heating and less apparatus, so the choice may depend on economics, on the installation environment, or on the preference of the user, rather than be dictated by process requirements. Either urea or aqueous ammonia is a suitable source for ammonia, and both may be converted to ammonia using the heat available in the diesel generator exhaust 60.

A second processed flow 70 flows from the SCR 38 into the silencer 50 through the heat exchanger hot side 40 and the ID fan 34*a*. A cleaned and quieted exhaust flow 15*b* is released from the silence 50 into the atmosphere. A heat transfer fluid is heated in the heat exchanger hot side 40 and flows through a rearward heat transfer tube 42 to the heat exchanger cold side 32 where heat is transferred to the flow through the heat exchanger cold side 32. The heat transfer fluid then flows back to the heat exchanger hot side 40 through a forward heat transfer tube 44.

Figure 6:
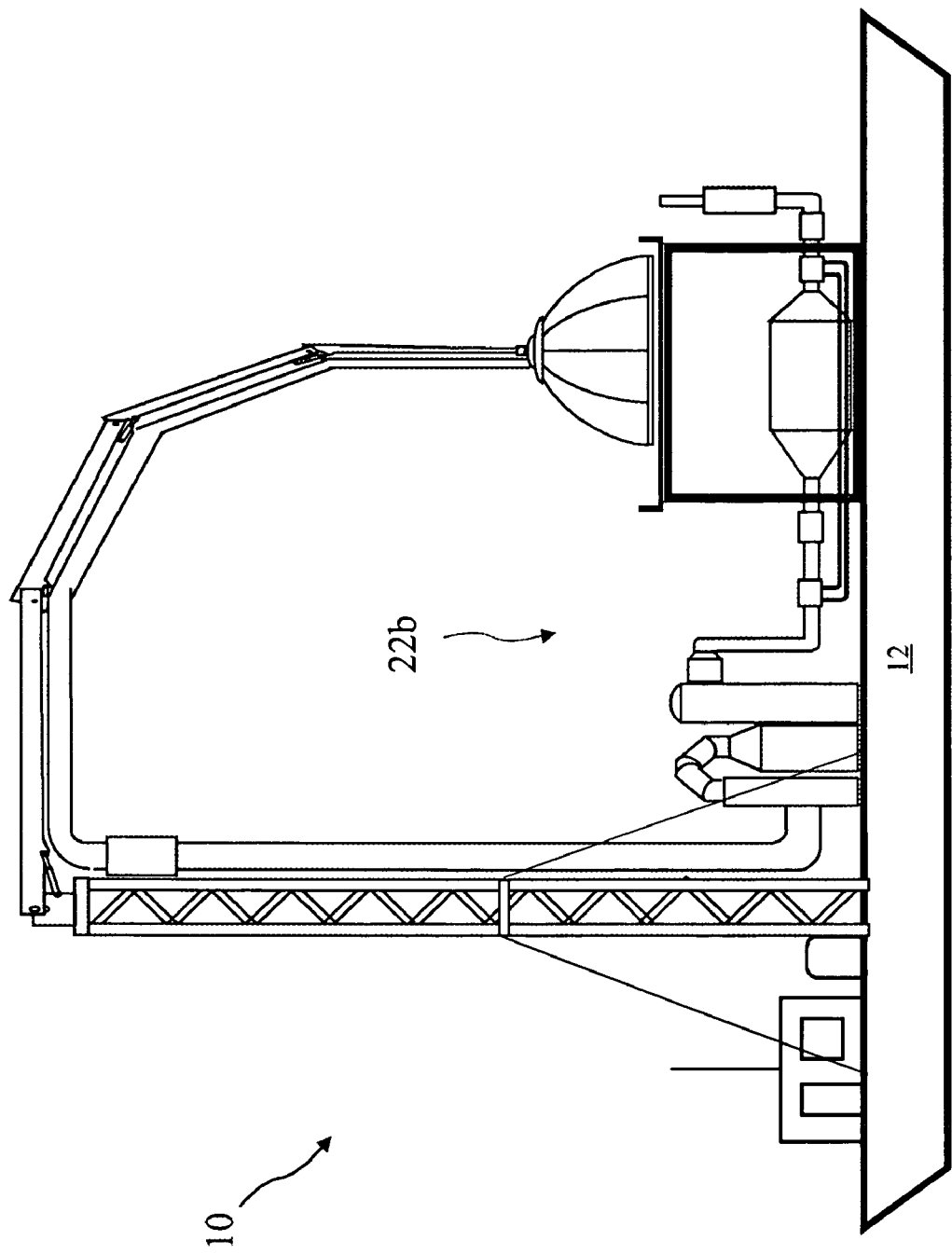
FIG. 6 shows the emissions control unit according to the present invention mounted on a barge.

An AMECS 10 including the ECU 22*b* mounted to a barge 12 is shown in FIG. 6. However, an ECU according to the present invention may be incorporated into various emissions control systems, and an ECU according to the present invention used with any means for capturing exhaust gases is intended to come within the scope of the present invention. For example, actuating arms having completely different designs are contemplated having fewer segments, lighter weight, and/or incorporating features specific to the present invention, and an ECU according to the present invention used with an AMECS 10 including any actuating arm for positioning the bonnet, or any other means of capturing exhaust gases, is intended to come within the scope of the present invention.

Figure 7:
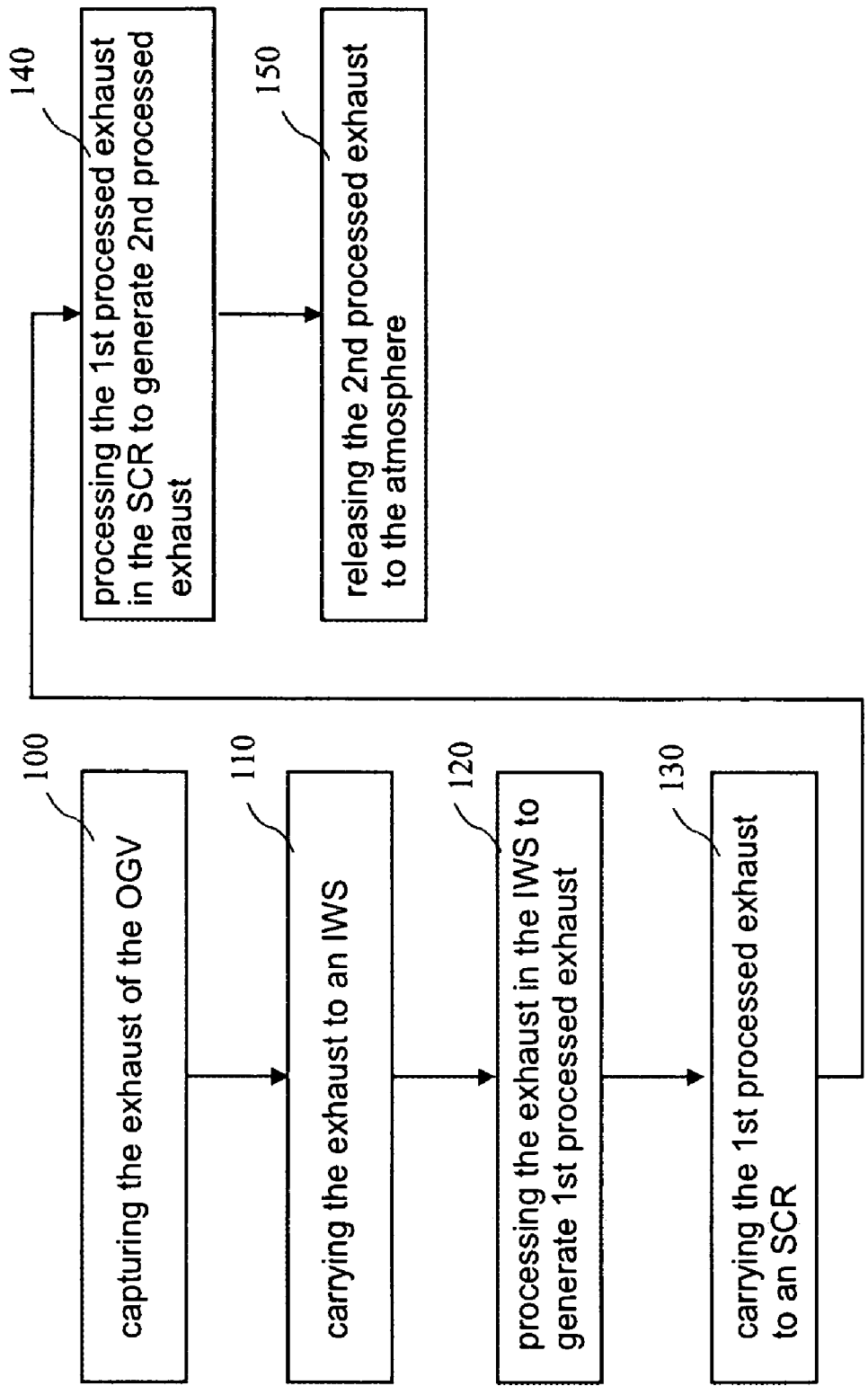
FIG. 7 describes a method according to the present invention.

A method for cleaning the exhaust flow of the OGV according to the present invention is described in FIG. 7. Exhaust flow from the OGV is captured at step 100. The exhaust flow is carried to an IWS 52 at step 110. The exhaust is process in the IWS 52 to generate a first processed exhaust flow at step 120. The first processed the exhaust flow is carried to the SCR 38 at step 130. The first processed exhaust flow is processed in the SCR 38 to generate a second processed exhaust flow at step 140. The second processed exhaust flow is released to the atmosphere at step 150. The method may further include using heat in the exhaust of a diesel generator to convert urea into ammonia used by the SCR 38.

While the invention herein disclosed has been described by means of specific embodiments and applications thereof, numerous modifications and variations could be made thereto by those skilled in the art without departing from the scope of the invention set forth in the claims.

We claim:

1. A method for cleaning Ocean Going Vessel (OGV) exhaust, the method comprising:
    capturing the exhaust of the OGV;
    carrying the exhaust to a first system of a maritime emissions control system;
    processing the exhaust in the first system to first reduce the temperature of the exhaust and then to process the reduced temperature flow to generate a first processed flow with reduced Particulate Matter (PM) and reduced Sulfur Dioxide ($SO_2$);
    carrying the first processed flow to a second system of the maritime emissions control system;
    heating the first processed flow, increase the temperature of the first processed flow;
    processing the heated first processed flow in the second system to generate a second processed flow with reduced $NO_x$; and
    releasing the second processed flow to the atmosphere.

2. The method of claim 1, wherein carrying the exhaust to the first system comprises carrying the exhaust to an Ionizing Wet Scrubber (IWS).

3. The method of claim 1, further including a heat exchanger capturing heat from the second processed flow and transferring the heat to first processed flow before heating the first processed flow.

4. The method of claim 1, wherein carrying the exhaust to the second system comprises carrying the exhaust to a Selective Catalytic Reducer (SCR).

5. The method of claim 4, further including:
    providing power for operation of the first system and the second system using a generator producing hot generator exhaust;
    mixing the hot generator exhaust with the flow into the SCR to increase the efficiency of the SCR; and
    extracting heat from a gaseous discharge of the SCR and transferring the heat to the gaseous inlet to the SCR.

6. A maritime emissions control system comprising:
    an Ocean Going Vessel (OGV) producing a dirty main exhaust flow;
    a platform selected from a land based platform, barge and a vessel;
    an emissions control system carried by the platform;
    support apparatus carried by the platform;
    a duct carried by the support apparatus, the duct disconnectably connectable to the OGV to place the main exhaust flow from the OGV in fluid communication with the emissions control system carried by the platform, the emissions control system sequentially comprising:
        a Particulate Matter (PM) and Sulfur Dioxide ($SO_2$) reduction system mounted to the platform and connected in fluid communication to the duct to receive the main exhaust flow from the OGV and to first cool the exhaust and second process the cooled exhaust to reduce PM and $SO_2$ in the main exhaust flow to produce a first processed flow from the first system; and
        an $NO_x$ reduction system mounted to the platform and connected to the PM and $SO_2$ reduction system to receive the first processed flow, first into a heater adding heat to the first processed flow, and then to reduce $NO_x$ in the heated first processed flow to produce a second processed flow.

7. The emissions control unit of claim 6, wherein the first system includes an ionizer to reduce PM and a wet scrubber to reduce $SO_2$ in the main exhaust flow.

8. The emissions control unit of claim 6, wherein the first system is further adapted to reduce Volatile Organic Compounds (VOCs) in the main exhaust flow.

9. The emissions control unit of claim 6, wherein power for operation of the emissions control system is generated by a diesel generator and generator exhaust from the diesel generator is processed by the second system.

10. The emissions control unit of claim 6, wherein the first system is selected from a group consisting of an Ionizing Wet Scrubber (IWS) and a cloud chamber scrubber.

11. The emissions control unit of claim 10, wherein the first system is an IWS.

12. The emissions control unit of claim 6, wherein the second system is selected from a group consisting of a low temperature SCR and a mid temperature SCR.

13. The emissions control unit of claim 12, wherein the second system is a mid temperature SCR.

14. The emissions control unit of claim 12, wherein the second system includes a catalyst material comprising a titanium vanadium tungsten compound.

15. The emissions control unit of claim 12, wherein the second system includes a core comprising a honeycomb structure containing materials to support the reactions required to reduce $NO_x$.

16. The emissions control unit of claim 12, wherein the second system includes a core comprising a granular media structure containing materials to support the reactions required to reduce $NO_x$.

17. The emissions control unit of claim 6, wherein the first system receives the main exhaust flow containing PM, $SO_2$, and $NO_x$, and produces the first processed flow having reduced PM and $SO_2$ and containing $NO_x$, and the second system receives the first processed flow having reduced PM and $SO_2$ and containing $NO_x$ and produces the second processed flow having reduced PM, $SO_2$, and $NO_x$.

18. The emissions control unit of claim 17, wherein the emissions control unit further including a quench tower for cooling the main exhaust flow before the first system receives the main exhaust flow.

19. The emissions control unit of claim 18, wherein the quench tower reduced the temperature of the exhaust flow to between 105 degrees Fahrenheit and 115 degrees Fahrenheit.

20. The emissions control unit of claim 6, wherein the first system and the second system operate from power generated by a diesel generator carried on the platform.

21. The emissions control unit of claim 20, wherein:
the second system is a Selective Catalytic Reducer (SCR); and
generator exhaust from the diesel generator is mixed with urea to produce ammonia for use with the SCR.

22. The emissions control unit of claim 20, wherein:
the second system is a Selective Catalytic Reducer (SCR); and
generator exhaust from the diesel generator is mixed with aqueous ammonia to produce ammonia for use with the SCR.

23. A maritime emissions control system comprising:
an Ocean Going Vessel (OGV) producing a dirty main exhaust flow;
an Emissions Control System (ECS);
support apparatus for the ECS;
a duct carried by the support apparatus, the duct disconnectably connectable to the OGV to place the main exhaust flow from the OGV in fluid communication with the ECS, the ECS sequentially comprising:
a quench tower in direct fluid communication with the duct producing a cooled exhaust flow;
a particle reduction apparatus in fluid communication with the quench tower, selected from selected from a group consisting of an Ionizing Wet Scrubber (IWS), a cloud chamber scrubber, a wet electrostatic precipitator, an electrostatic precipitator, a scrubber, an absorption devices, a mechanical separator, a filter, a thermal device, and a plasma reactor to process the cooled exhaust to reduce Particulate Matter (PM) and Sulfur Dioxide ($SO_2$) in the main exhaust flow to produce a first processed flow from the first system;
a heating apparatus connected in fluid communication with the particle reduction apparatus, to increase the temperature of the first processed flow;
an $NO_x$ reduction apparatus selected from a group consisting of a low temperature Selective Catalytic Reducer (SCR), a mid temperature SCR, a non-selective catalytic reducer, a plasma based $NO_x$ reduction system, an ionization based $NO_x$ reduction system, a thermal $NO_x$ reduction system, a photochemical based $NO_x$ reduction system, a chemical $NO_x$ reduction system, and an electrochemical based $NO_x$ reduction system, connected in fluid communication with the heating apparatus, to receive the heated first processed flow and to reduce $NO_x$ in the heated first processed flow to produce a clean second processed flow; and
a heat exchanger capturing heat from the second processed flow and transferring the heat to first processed flow before heating the first processed flow.

\* \* \* \* \*